United States Patent [19]

Titus

[11] Patent Number: 5,550,410

[45] Date of Patent: Aug. 27, 1996

[54] GAS TURBINE ELECTRICAL POWER GENERATION SCHEME UTILIZING REMOTELY LOCATED FUEL SITES

[76] Inventor: Charles H. Titus, 323 Echo Valley La., Newtown Square, Pa. 19073

[21] Appl. No.: 284,148

[22] Filed: Aug. 2, 1994

[51] Int. Cl.$^6$ .............................. H02K 7/18; F01D 15/10; F02C 6/00; F02D 29/06
[52] U.S. Cl. ........................ 290/52; 290/1 R; 290/4 A; 361/84
[58] Field of Search ............................ 290/1 R, 4 A, 290/52; 60/39.01, 39.12; 361/84

[56] References Cited

U.S. PATENT DOCUMENTS

| | | | |
|---|---|---|---|
| 3,416,002 | 12/1968 | Faust | 361/13 |
| 3,719,532 | 3/1973 | Falkenberg et al. | 136/208 |
| 3,839,666 | 10/1974 | Kitaev | 363/138 |
| 4,057,736 | 11/1977 | Jeppson | 307/78 |
| 4,131,937 | 12/1978 | Pelly et al. | 363/96 |
| 4,359,951 | 11/1982 | Dauvergne | 110/234 |
| 4,555,637 | 11/1985 | Irvine | 290/52 |
| 4,831,277 | 5/1989 | Christopher | 290/1 A |
| 4,942,863 | 7/1990 | Chou et al. | 126/110 E |
| 5,287,695 | 2/1994 | Schneider | 60/39.12 |
| 5,332,959 | 7/1994 | Malmquist et al. | 322/14 |

*Primary Examiner*—Steven L. Stephan
*Assistant Examiner*—Christopher Cuneo
*Attorney, Agent, or Firm*—Dann, Dorfman, Herrell and Skillman, P.C.

[57] ABSTRACT

A remote electrical energy generating and distribution system is provided wherein a plurality of combustion turbine generators are located at respective remote sites having deposits of fossil fuel. The fossil fuel is thereby converted into electrical energy for transmission to an energy utilization center or to a power grid. Electrical energy is preferably converted to DC energy at the remote sites, and is supplemented by thermoelectric energy recovered from the exhaust of the combustion turbines. Each such source of DC energy is coupled to a main transmission line by a diode coupling device for providing isolation of each source in the event of a reduction in output voltage. Local power for cooling the diode coupling device is provided by a forward conduction voltage drop within the coupling device. The DC transmission system allows each generator to be operated at any independent optional speed.

47 Claims, 3 Drawing Sheets

5,550,410

GAS TURBINE ELECTRICAL POWER GENERATION SCHEME UTILIZING REMOTELY LOCATED FUEL SITES

FIELD OF THE INVENTION

The present invention relates to a system for transmitting energy in the form of electricity from a fossil fuel deposit to a desired location. Specifically the invention relates to an energy system wherein a fossil fuel is converted to electrical energy at the site of the deposit and then the electrical energy is transmitted to an energy utilization center.

BACKGROUND

Known energy resources such as deposits of fossil fuel are occasionally left untapped or underutilized for a variety of reasons. A deposit of fossil fuel may, for example, be located at a site that is remote from an appropriate transportation system, such as a railway or pipeline, for transporting the fuel to an energy utilization center, such as a power plant. Even a readily-accessible deposit of fossil fuel may remain untapped or underutilized if the deposit is of such small capacity or of low energy content as to negate profitable exploitation.

Fossil fuel markets are prone to occasional fluctuations that mitigate against sustained exploitation of marginally profitable deposits. Typically, such marginal deposits are alternately exploited and left idle in response to market cycles of shortage and oversupply. It would be desirable to provide an alternative use for marginal deposits of fossil fuels during periods of oversupply in order to maintain sustained production and hence to obviate the expense of alternately mothballing and re-tapping such deposits.

Low energy content natural gas is a good example of an occasionally underutilized energy resource. It is a standard requirement in the natural gas industry that pipeline-quality natural gas possess an energy content on the order of 1,000 Btu/ft$^3$. A consequence of this energy requirement has been underutilization of gas fields which produce natural gas having an energy content of less than about 800 Btu/ft$^3$. Where it has been economically feasible, such low-quality gas has been blended with gas having an energy content in excess of 1,000 Btu/ft$^3$ in order to obtain a product meeting the standard. Such blended gas, however, may contain significant quantities of undesirable impurities and is not preferred by industrial gas consumers. It is also often the case that low-quality gas is available in gas fields that are geographically remote or of such low BTU capacity that blending such gas with higher-quality gas would not justify the expense of obtaining rights-of-way and constructing pipelines to carry the gas from the fields to a suitable site for blending.

While fossil fuels are occasionally underutilized, electric utilities have generally experienced a steady decline in the excess generating capacity needed in order to meet peak electrical demand. It has also become increasingly difficult for electric utilities to overcome social and economic barriers to the construction of large, base generating units. It would be desirable to provide a system for generating electrical energy which could be conveniently deployed during periods of peak demand. A system that could provide incremental units of supplementary base generating capacity as needed would also be desirable.

Combustion turbine/generator units are widely used for peak power generation. Combustion turbines are known which use such fuel sources as natural gas, petroleum, or finely divided, particulate material. Gas-fueled combustion turbine/generator units have become a particularly attractive means for generating electrical energy since they may be more rapidly brought online than other types of generating units. Natural gas also tends to be less polluting and more economical than other combustion turbine fuels.

Gas-fueled combustion turbines operate with optimal efficiency at rotational speeds which range between 4,000 RPM and 20,000 RPM depending upon the type of turbine and the load which the turbine is required to drive. In order to provide AC power at a standard frequency of 60 Hz with standard generating equipment, it is necessary to regulate the rotational speed of the generator to precisely 3,600 RPM. Hence systems employing gas-fueled combustion turbines to drive conventional generators may suffer from inherently sub-optimal energy conversion efficiency unless a speed-reducing gear box is interposed between the gas turbine and the generator.

It would therefore be desirable to provide a system by which a fossil fuel such as low-quality natural gas could be economically utilized in order to meet the growing demand for electricity. It would further be desirable to maximize the efficiency by which such fuels are converted into electrical energy within such a system by allowing the combustion turbine units to modulate their rotational speed freely in response to load requirements.

SUMMARY

In accordance with one aspect of the present invention there is provided a system and method for transporting energy from a remotely located deposit of fossil fuel to an energy utilization center, such as an electric power subtransmission line, distribution system, power grid, or an industrial user. Broadly stated, the system includes a deposit of fossil fuel, such as coal, petroleum, or natural gas, apparatus located at the deposit site for converting the fossil fuel to electrical energy, and means for transmitting the electrical energy to the energy utilization center.

In accordance with another aspect of this invention there is provided an energy conversion unit comprising a combustion turbine and an electrical generator that is located on-site at or near the fossil fuel deposit. The turbine is fueled by locally-produced fuel to drive the electrical generator. Electrical energy from the generator is then transmitted to a desired location. Transmission of energy from the fossil fuel deposit in the form of electricity obviates the necessity of transporting the fuel itself from the deposit.

The generating unit is preferably portable so that it may be transported to another location when the supply of fossil fuel becomes exhausted or when electricity generation at the site of the deposit becomes otherwise disadvantageous. The generating unit may also include a thermoelectric generator for recovering additional electrical energy from thermal energy present in the exhaust stream from the combustion turbine.

Electrical power generated by the on-site facility is preferably converted to DC electricity prior to transmission by a high-voltage DC transmission system. The DC transmission system is insensitive to the operating speed of the turbine which is thereby allowed to operate at an optimal rate. The use of a DC transmission system simplifies connection to the AC grid and integration of multiple on-site units.

BRIEF DESCRIPTION OF THE DRAWINGS

The foregoing summary, as well as the following detailed description of a preferred embodiment of the present inven

DETAILED DESCRIPTION

Figure 1:
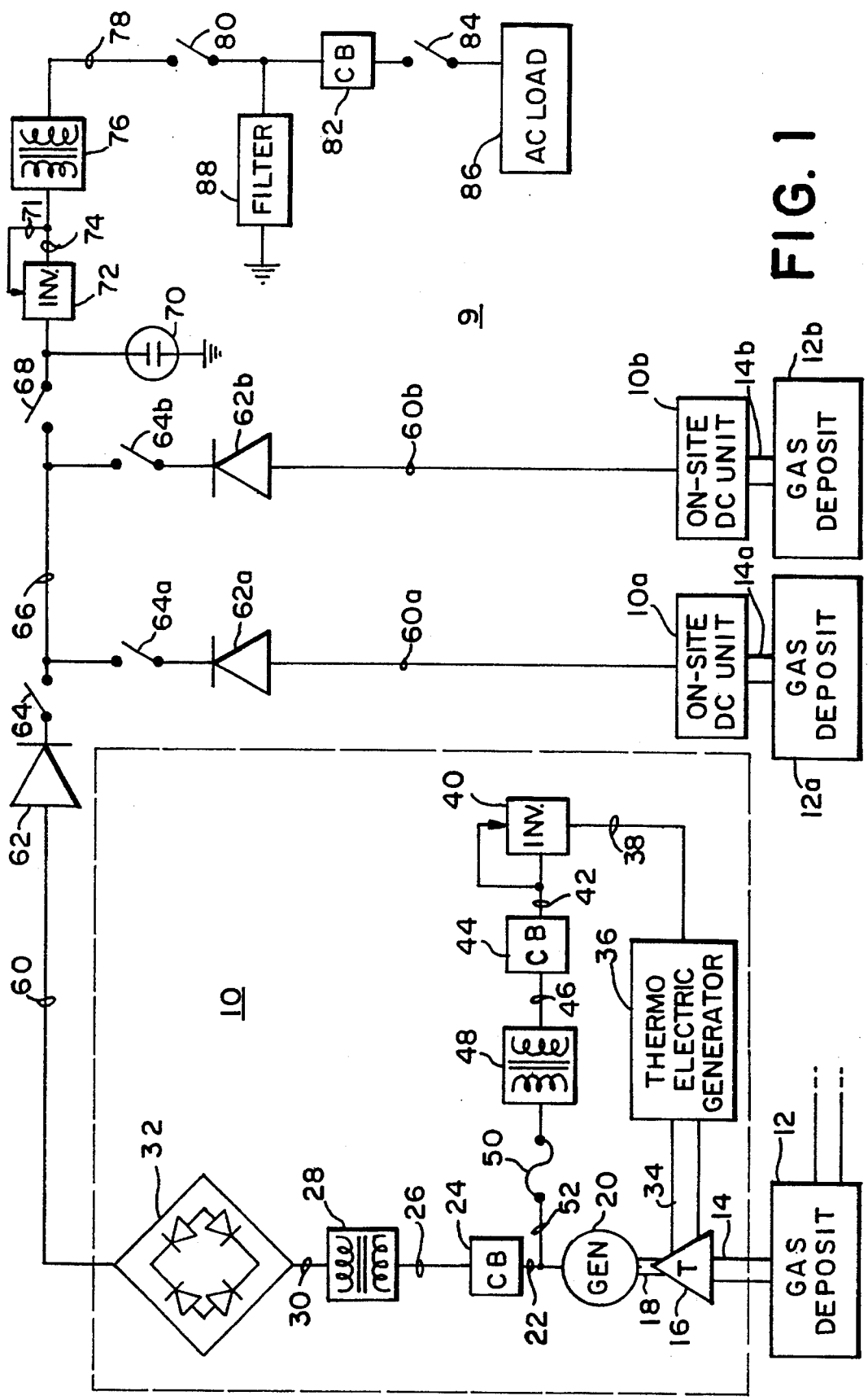
- FIG. 1 is a schematic diagram of a system for transmitting energy from a remotely located fossil fuel deposit to an AC power system.

An energy system 9 in accordance with the invention is shown in FIG. 1. The system 9 transmits energy in the form of electricity from a fossil fuel deposit to a location at which the electricity is utilized. The fossil fuel deposit, shown as a natural gas deposit 12, may alternatively consist of such resources as petroleum or coal. Other acceptable fuels can include synthetic gas produced from coal or shale. The energy density of acceptable fuels can be as low as 125 Btu/ft$^3$. Some low-quality fuels contain impurities which would cause emission of undesirable combustion products or other pollutants and may require the use of pollution control devices in order to reduce the level of such emissions below such levels as may be mandated by regulatory authorities. In general, combustion of fuels having a reduced energy content results in lower $NO_x$ production than combustion of an equivalent amount of the same type of fuel having a higher energy content.

The energy utilization center, typically a utility company or an industrial consumer of AC power, is shown as a remote AC load 86. Alternatively, the energy system 9 may deliver energy to an AC power grid. Since the energy system 9 transmits energy in the form of electricity, the fossil fuel deposit is one that might otherwise remain untapped or underutilized. For example, the gas produced by the natural gas deposit 12 can be below pipeline-quality and/or the deposit 12 could be of such limited production capacity that the expense of constructing a suitable delivery system would render exploitation of the deposit unprofitable. It is to be understood that the invention can also be practiced in conjunction with commercially valuable deposits of fossil fuel as an adjunct to the production of the fossil fuel.

In the system 9 of FIG. 1, natural gas from the gas deposit 12 is provided from a well 14 to an on-site generating unit 10 located in or near the gas field with the gas deposit 12. The on-site generating unit 10 consumes gas from the well 14 and generates electrical energy in the form of DC electricity at a desired voltage, preferably between 20 kV and 800 kV. The DC electricity is transmitted from the on-site generating unit 10 via a local high-voltage DC transmission cable or overhead line 60. Local high-voltage DC cable 60 transmits the high-voltage DC electricity through diode unit 62 and isolation switch 64 to a DC bus or main cable 66. The DC main cable 66 transmits DC electricity through switch 68 to the input of an inverter such as line-commutated inverter 72. As described more fully hereinafter, the diode unit 62 provides isolation of the local DC cable 60 in an embodiment having a plurality of on-site generating units. It is noted that in an embodiment of the invention wherein a single on-site generating unit is employed, an intervening isolation device such as diode unit 62 is not required.

In the event that the inverter 72 needs to be disconnected rapidly, a short-circuit switch 70 is connected in parallel with the DC side of the inverter 72 to short circuit the DC input side of the inverter 72. Various types of known shorting devices may be used to isolate the inverter 72. Preferably, the short-circuit switch 70 is of a type having a magnetic flux shifting controlled contact closing mechanism. When the switch 70 is actuated, the DC main cable 66 completely discharges and no current may be flowing before the switch 70 can be re-opened.

The inverter 72 converts the DC electrical input to AC electricity. The AC electricity may then be transmitted to an AC load. In the preferred embodiment, the AC side of the inverter 72 is connected with an AC utility system. In such an embodiment, the AC output of the inverter 72 must be synchronized to the utility system. Inverters of the preferred type have a commutation input 71 to provide such synchronization. The commutation input 71 may be connected to the AC side of the inverter in order to maintain a constant phase relationship with the AC utility system. The inverter 72 preferably supplies three-phase AC electricity through AC line 74 to a transformer 76 which matches the AC voltage produced by the inverter 72 to a voltage compatible with the AC load 86. The output of transformer 76 is transmitted along AC line 78 through isolation switch 80, circuit breaker 82, and isolation switch 84 to the AC load 86. A harmonic filter 88 is connected across the output of transformer 76 in order to remove undesirable harmonic components of the AC voltage developed by the inverter 72 and the transformer 76. The harmonic filter 88 and the circuit breaker 82 are isolated for service by opening isolation switches 84 and 80. The inverter 72 and transformer 76 are isolated by opening isolation switches 80 and 68.

As shown in FIG. 1, the energy system according to this invention can be configured to transmit electrical energy only in one direction from the generators to the load and from multiple sources of fossil fuel such as gas wells 14a and 14b in addition to gas well 14. The gas wells 14a and 14b may tap into the same deposit 12 as gas well 14, or they may tap into other deposits 12a and 12b as shown. Natural gas from gas wells 14a and 14b is provided to respective on-site generating units 10a and 10b in the arrangement shown. Local DC cables or overhead lines 60a and 60b transmit DC electricity from the respective on-site generating units 10a and 10b through diode units 62a and 62b and isolation switches 64a and 64b to the DC main cable 66.

It is noted that the on-site generating units 10, 10a, and 10b may be geographically remote from one another such that each generator and its associated diode rectifier equipment delivers DC power to respective DC lines 60, 60a, and 60b. The DC lines 60, 60a, and 60b terminate at respective isolating diode units 62, 62a, and 62b which connect to the main high voltage DC cable or overhead line 66. The DC line 66, in turn, connects with the DC side of the inverter 71. The inverter 71 produces 3-phase AC power which is then delivered to the utility system. If the on-site generating units are located at a single site, or at proximate sites, their electrical outputs may be connected in parallel to an AC collection bus at which point a single diode rectifier is used to convert the AC power to DC power at a voltage compatible with that required by the inverter 71. Collection of AC power from two or more generators on a common bus necessitates the synchronization of the generators which, in turn, means that the rotational speed of all the generators must remain the same. In such an embodiment, it is not possible to change the speed of one turbine relative to the other parallel-connected turbines as the load changes. Thus, in such an embodiment, it may not be possible to operate all of the turbines at maximum efficiency under all loading conditions.

A preferred embodiment of an on-site generating unit 10 for use in the system 9 according to the present invention is shown schematically in FIG. 1. Natural gas from the deposit 12 is provided from the well 14 to a combustion turbine 16. The well 14 includes pressure and flow regulators (not shown) for controlling the rate at which the gas is extracted from the deposit and supplied to the combustion turbine. The combustion turbine 16 converts the fossil fuel to mechanical energy in the form of rotary motion which is transmitted via a direct drive shaft 18 to an AC generator 20. In an embodiment wherein the fossil fuel deposit comprises a coal seam, the coal is pulverized to produce a finely divided particulate to fuel the combustion turbine. The AC generator 20 generates three-phase AC electricity which is transmitted via AC line 22 through circuit breaker 24 to a high-voltage transformer 28. High-voltage transformer 28 steps the generator AC voltage up to a higher AC voltage which is then provided via AC line 30 to a multiphase solid-state rectifier 32. The rectifier 32 produces a high-voltage DC output which is provided to the local DC cable 60. The rectifier 32 preferably includes a three-phase full-wave diode bridge rectifier. The rectifier 32 may alternatively include a conventional multiphase thyristor rectifier. Diode-based rectifiers produce fewer harmonics than thyristor rectifiers in addition to providing inherent isolation from the electrical transmission system in the event of a transient event or a failure in the electrical generating system.

Gas-fueled combustion turbine/generator sets typically operate at an energy conversion efficiency between 30% and 36%. The largest portion of the remaining 70% to 64% of the "first law" potential energy of the combustible fuel is discharged as waste heat in the exhaust. The on-site generating unit 10 may include means for recovering useful energy from the waste heat present in the exhaust stream of the gas turbine 16. The exhaust stream is coupled via a duct 34 to a thermoelectric generator 36 which converts heat from the exhaust stream into DC electricity typically at a voltage between 200 V to 400 V. The thermoelectric generator 36 preferably comprises a plurality of solid-state thermoelectric devices, such as semiconductor junctions, which are connected in series-parallel combinations to provide the desired voltage and current. The efficiency with which such a semiconductor junction converts thermal energy into electrical energy is determined to a significant extent by the operating temperature and by the bandgap energy of the semiconductor. The temperature of the turbine exhaust typically ranges as high as 1200° F. Thermoelectric devices are suitable for use at temperatures below 1200° F. Since the exhaust cools as it passes through the thermoelectric generator, semiconductor devices having successively smaller bandgap energies are serially arranged along the interior of the thermoelectric generator in the direction of exhaust flow. In this manner, the conversion efficiency over the useful temperature range of the exhaust stream is maximized.

The DC electricity from the thermoelectric generator 36 is transmitted via DC cable 38 to an inverter such as line-commutated inverter 40. The line-commutated inverter is synchronized to the output of generator 20 in any well-known manner. The AC output of inverter 40 is transmitted through a circuit breaker via AC line 42 to a transformer 48. The transformer 48 provides an output voltage of inverter 40 which is equal to the output voltage of generator 20. The output of transformer 48 is transmitted via AC line 52 through a fuse 50, or other circuit protecting device, and coupled to the output of generator 20. Thermoelectric recovery from the turbine exhaust heat may contribute 10% to 25% of the total power output of the on-site unit 10.

Figure 2:
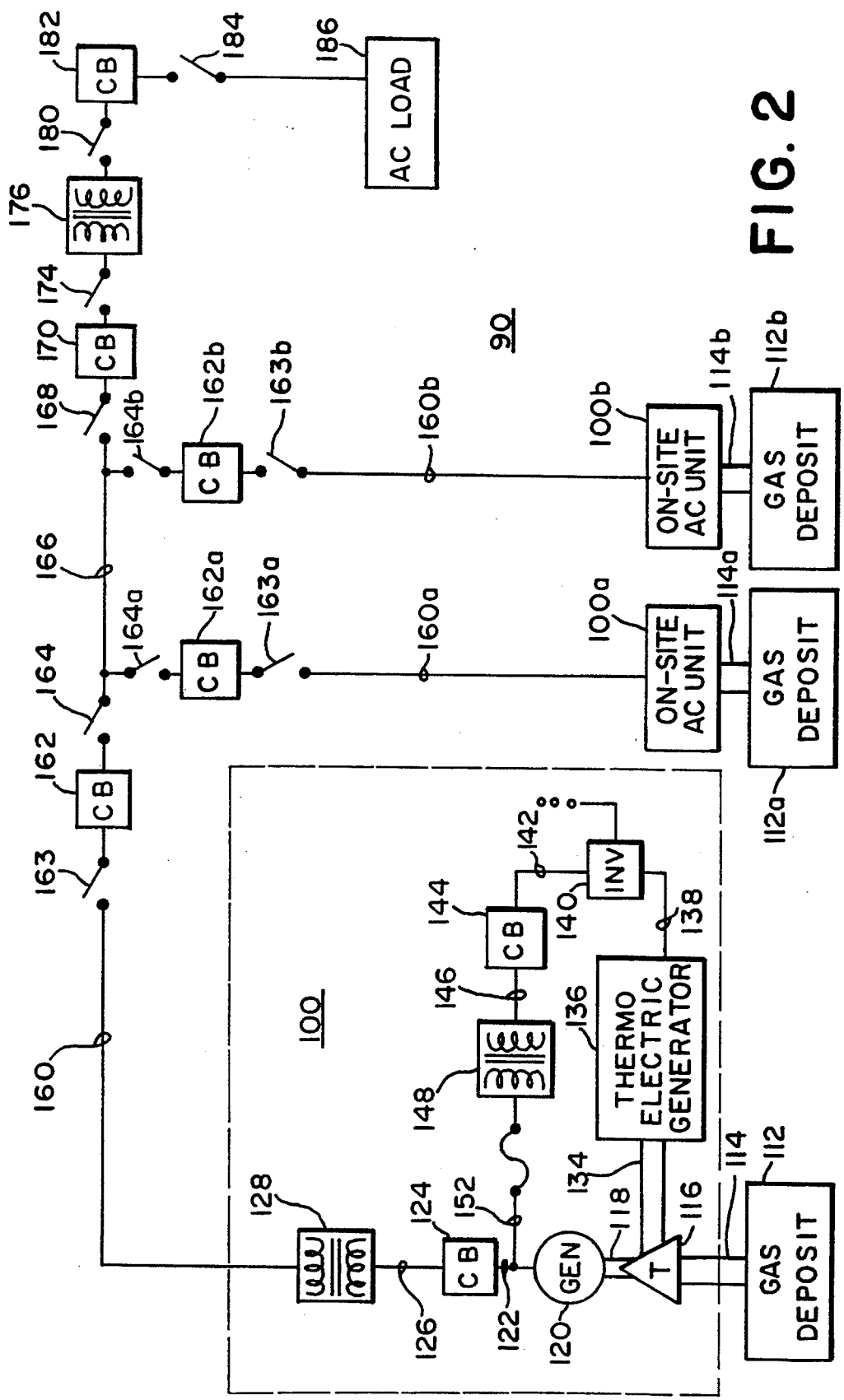
FIG. 2 is a schematic diagram of another embodiment of a system for transmitting energy from a remotely located fossil fuel deposit to an AC power system.

In a further embodiment of the present invention, electrical energy generated at the site of a fossil fuel deposit may also be transmitted to a remote load in the form of AC electricity as shown in FIG. 2. A deposit of natural gas 112 provides Was via a well 114 to an on-site AC generation unit 100. The on-site AC generation unit 100 provides three-phase AC electricity to a local AC line 160. AC line 160 is preferably capable of carrying a voltage from about 2.4 kV RMS to 13.2 kV RMS. The AC electricity is transmitted via the AC line 160 to transformer 176 which steps the voltage to an appropriate value for delivery to an AC load 186 which may be an AC power system or an industrial consumer of AC power. Additional on-site generation units 100a and 100b may be employed in the same or in separate gas fields to generate electricity from respective gas wells 114a and 114b. When additional on-site generating units are used, each of the units delivers electrical energy via respective local AC lines 160, 160a, and 160b to a bus, such as main AC line 166, which transmits the electrical energy to the transformer 176. At the junction between each local AC line and the main AC line 166, fault protection is provided by circuit breakers 162, 162a, and 162b in series with each local line. The circuit breakers are provided with isolation switches such as switches 163 and 164 in the known manner. The transformer 176 is also provided with circuit breakers 170 and 182 in series with the primary and secondary windings, respectively, to protect against line-side or load-size faults. Each of the circuit breakers 170 and 182 is provided with a pair of isolation switches 168, 174 and 180, 182, respectively.

The configuration of the on-site AC generating unit 100 is similar to the DC unit 10 described in connection with FIG. 1 except that a rectifier is not employed to rectify the output of the AC on-site generating unit. The configuration of on-site AC generation unit 100 is shown schematically in FIG. 2. The gas deposit 112 provides natural gas via a well 114 to a gas turbine 116. The gas turbine 116 converts the fossil fuel to mechanical energy in the form of rotary motion which is transmitted via a mechanical linkage 118 to an AC generator 120. The AC generator 120 preferably generates three-phase AC electricity which is transmitted via AC line 122 through circuit breaker 124 to a high-voltage step-up transformer 128. The high-voltage transformer steps up the voltage from line 126 to a suitable voltage for transmission via local AC line 160.

The on-site AC generating unit is preferably provided with means for recovering useful energy from the exhaust stream of the gas turbine 116. The exhaust stream 134 from the turbine 116 is coupled to a thermoelectric generator 136 which converts heat from the exhaust stream 134 into DC electricity as described above. The DC electricity from the thermoelectric generator 136 is transmitted via DC cable 138 to an inverter such as line-commutated inverter 140. The line-commutated inverter is synchronized and coupled to the output of generator 120 and through a circuit breaker via AC line 142 and a step-up transformer 148. The transformer 148 steps the voltage from inverter 140 to a value commensurate with the voltage output from generator 120.

The DC energy system 9 described in connection with FIG. 1 is preferred because it possesses advantages of economy and efficiency over the AC system 90 described in connection with FIG. 2. Within the AC system, a standard generator must be driven at a particular rotational speed in order to synchronize the generator with the standard frequency of the AC transmission network. For example, a standard AC generator must be driven at the 3600 RPM to provide AC power at 60 Hz. A similar requirement is imposed upon AC generation systems in 50 Hz networks. The efficiency with which a gas turbine converts chemical energy from the natural gas into mechanical energy is improved when the turbine operates at a speed higher than 3600 RPM, such as 4,000 RPM to 20,000 RPM, and preferably in a range of about 5000 RPM to about 10000 RPM. In a conventional AC generating system, the turbine and generator are sometimes coupled by a mechanical linkage system such as a reduction gear or variable speed-transmission in order to allow the turbine and the generator to operate at different speeds of rotation. However, such linkage systems reduce the efficiency of the kinetic energy transfer between the turbine and the generator in contrast to a directly coupled system. Since the DC system 9 is substantially insensitive to the frequency at which the generator 20 produces AC power, the turbine can be directly coupled to the generator by shaft 18 and can be operated at speeds higher than 3,600 RPM in order to obtain greater turbine energy conversion efficiency. Additionally, the electrical power output from such a directly coupled generator increases linearly with the rotational speed at which the generator is driven. The higher AC frequency produced by the generator 20, for example, 80 Hz to 120 Hz, results in a lower ripple factor in the DC voltage output from the rectifier 32 relative to a 60 Hz operating frequency. The incremental power loss within the step-up transformer 28 resulting from the higher operating frequency is more than compensated for by the linear increase in output voltage and kilovolt-amperes (kVA). The frequency of operation of the on-site DC unit is within the range of about 50 Hz to 400 Hz and preferably in the range of about 75 Hz to 150 Hz.

Transmission of DC power such as by cables 60 and 66 shown in FIG. 1 may be less expensive than transmission of AC power via overhead lines such as lines 160 and 166 shown in FIG. 2. Transmission of three-phase AC power requires 3 high-tension lines. Delivery of DC power requires a single power cable and a ground which may be an earth ground, although, it is preferable to use a return conductor in the DC system. The return conductor need not be a high-voltage conductor. A system for transmitting DC electricity generally requires a smaller investment in rights-of-way, cable, insulators, and towers relative to an equivalent AC transmission system.

Combining the output of several on-site electrical generating units is simplified within a DC system relative to an AC system. In the grid-connected system 90 of FIG. 2, it is necessary to allow bi-directional power flow in the AC transmission system in order to maintain synchronization between the AC generator 120 and the AC grid. Even if synchronization with the grid were not necessary, preventing bi-directional power flow in an AC system would be a costly undertaking. Such bi-directional power flow carries the risk of having one of the on-site units 100, 100a, or 100b appear as a load to the system 90. In case of a fault on a local AC line 160, 160a or 160b, the failed branch will appear as an energy load to the AC main line 166. The circuit breaker 162 at the connection between the local AC line 160 and the AC main 166 must be able to respond rapidly and reliably to such a short circuit condition so that the entire system is not affected. In the DC system 9 shown in FIG. 1, a short on the local DC cable 60 is reliably and automatically isolated from the DC main 66 by the diode unit 62. As soon as the voltage on the local DC cable 60 falls below the voltage on the DC main 66, conduction through the diode unit 62 will cease in the relatively short period of time required for the injected charge distribution within the diode unit 62 to decay and for a sufficient space-charge region to develop about the PN junction or junctions of the diode unit 62. Such automatic isolation can be effected in less than 100 µs.

In a conventional AC energy system, whenever additional AC generator capacity is added to the system, the potential short circuit current is increased to the extent that any previously-installed circuit breakers, or other short-circuit protection devices, are not capable of interrupting the additional short-circuit current. In order to safely add more generating capacity, replacement of existing protection equipment may be required. Such replacement can be expensive.

When additional generating capacity is added to an energy system in accordance with that shown in FIG. 1, the potential short-circuit current in the AC system downstream of the inverter 71 does not increase since the inverter will deliver no more than its steady-state AC output current. Accordingly, generating capacity can be easily added to the energy system of FIG. 1 without requiring expensive replacement of short-circuit protection equipment in the AC utility system.

The 3-phase diode rectifier 32 located at the generating unit 10, and the thyristor inverter 71 located adjacent the AC power grid, both have AC power available to operate cooling fans or other auxiliary equipment. In some embodiments, the diode units 62, 62a, and 62b which connect the DC output from respective generating units 10, 10a, and 10b to the main DC cable or overhead line 66 will be in a remote location where AC auxiliary power is not available. In such an embodiment, auxiliary power is obtained as described hereinafter in connection with FIG. 3.

Figure 3:
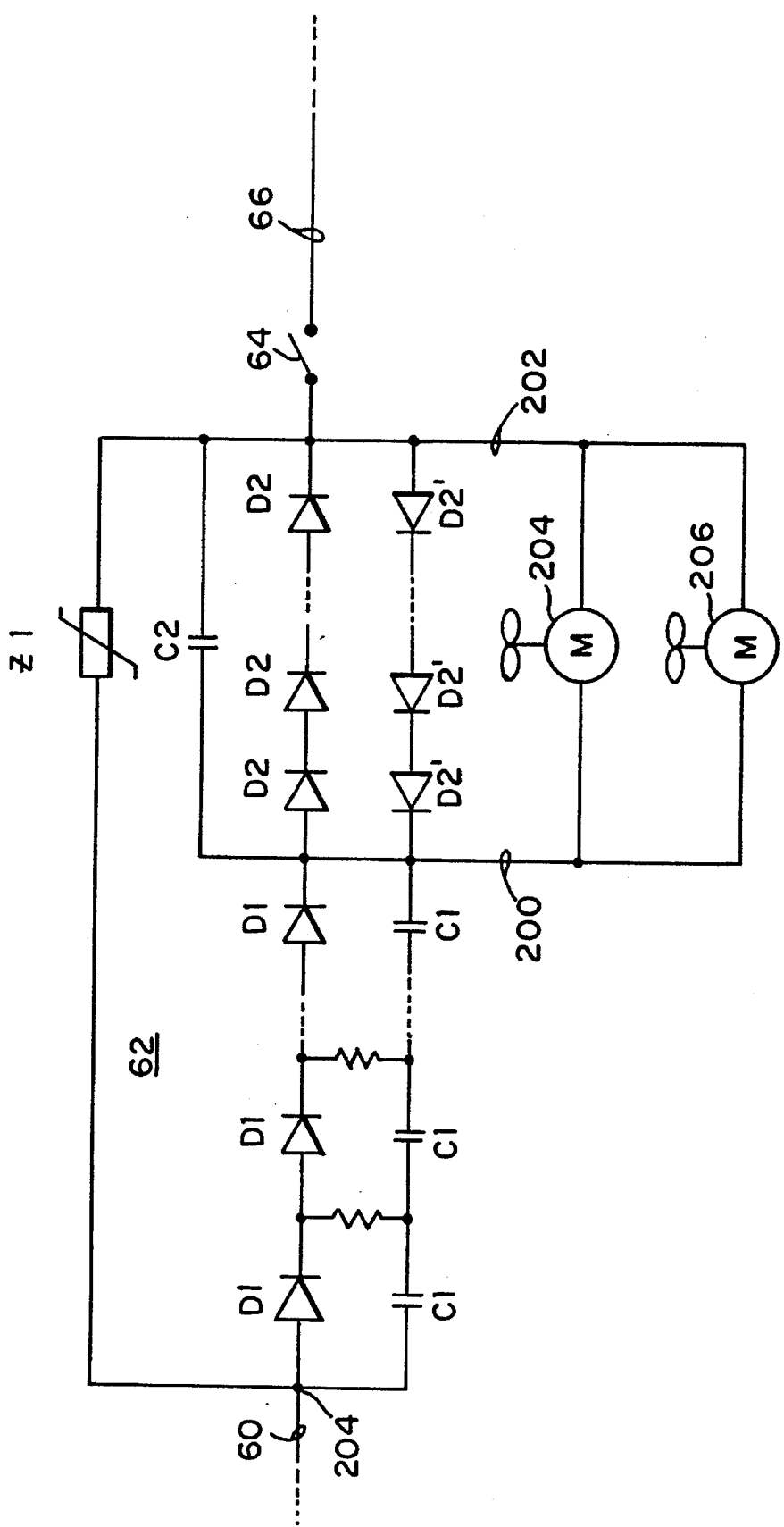
FIG. 3 is a schematic diagram of a diode arrangement for use in the energy system of FIG. 1.

Referring now to FIG. 3, there is shown a schematic diagram of the diode unit 62. DC current is delivered to an input terminal 204 of the diode unit 62 via DC line 60 from the on-site generating unit 10. A plurality of high-voltage diodes D1 are connected in series with DC line 60 at terminal 204 in order to conduct DC current from DC line 60 to terminal 200. A plurality of capacitors C1 are also connected in series between DC line 60 and terminal 200 in parallel with the high-voltage diodes D1. A plurality of resistors R are connected in a ladder configuration between the series connections of the diodes D1 and the series connections of the capacitors C1. The resistors R and the capacitors C1 provide damping of the transient behavior of the diodes D1. Additionally, the capacitors C1 provide a conduction path for longitudinal transient voltages across the series-connected diodes D1.

A plurality of low-voltage diodes D2 are connected in series between terminal 200 and terminal 202. Switch 64 is connected to terminal 202 in order to connect the diode unit 62 to the DC main cable 66 or to disconnect the diode unit 62 from the main cable 66. The diodes D2 are preferably of the type having a forward conduction voltage drop of about 0.6 volts or 0.7 volts. Preferably, about 20 diodes D2 are connected in series to produce a forward conduction voltage drop of about 12–14 volts between terminal 200 and terminal 202.

The voltage drop across the diodes D2 is used to provide an operating voltage to an auxiliary system, such as one or more cooling fans 204 and 206. The cooling fans 204 and 206 are preferably 12 volt DC fans that are connected in parallel across terminals 200 and 202. The cooling fans 204 and 206 are mechanically arranged to circulate an electrically insulating coolant gas, such as air or sulfur hexafluoride, about the several components of diode unit 62 via insulating ducts (not shown).

In order to protect the cooling fans 204 and 206 from exposure to high voltages, a plurality of diodes D2' are connected in series between terminals 200 and 202 in the reverse direction relative to the diodes D2. Thus, the steady-state DC voltage between terminals 200 and 202 will not exceed the forward conduction voltage of the series connected diodes D2 or D2'. For this reason, the reverse breakdown voltage of the diodes D2 and D2' does not need to be as high as the reverse breakdown voltage of the diodes D1, which are primarily responsible for blocking reverse current flow through the diode unit 62.

In order to protect the cooling fans 204 and 206 from transient voltages, a capacitor C2 is connected between terminal 202 and terminal 200. Thus, a capacitive transient conduction path is established through diode unit 62 through capacitor C2 and through the series-connected capacitors C1.

A threshold-voltage conduction device, such as a metal-oxide varistor Z1, is connected between terminal 202 and DC line 60 in order to protect all of the components of the diode unit 62 from rapid high-voltage transients, such as lightning strikes.

As can be appreciated, the configuration of the components of the diode unit 62 may be other than as shown in FIG. 3. For example, the low voltage diodes D2 and D2' may be connected between terminals 204 and 200, while the high-voltage diodes D1 may be connected between terminals 200 and 202, without altering the operation of the diode unit 62. Moreover, it is contemplated that electronic devices other than PN junction diodes may be satisfactorily employed within the diode unit 62 to provide the same diode functions of blocking reverse current flow and providing a voltage drop for operating auxiliary equipment.

A DC conductor is not subject to the skin effect, an AC condition in which the current flow is confined to the outer surface layer of a conductor. Thus, current can be delivered in the DC energy system according to the present invention via a conductor having a reduced cross-sectional area, yet with no greater resistive ($I^2R$) losses compared to an AC system carrying the same amount of current. Alternatively, a DC cable provides a lower $I^2R$ loss than an AC cable of the same diameter carrying the same amount of current. Parasitic reactance of transmission cables, in the form of series inductance contributes to AC power system instability. In a DC power delivery system, such as that shown in FIG. 1, parasitic reactance can improve the stability of the power system by reducing current ripple.

It has recently been alleged that exposure to electromagnetic radiation from AC power transmission lines increases the risk of contracting certain cancerous diseases. Although the correlation between the incidence of such diseases and electromagnetic leakage from AC power transmission lines is largely speculative at present, public concern has begun to influence regulatory siting approval of AC power lines. DC power transmission systems should not face opposition on these grounds because DC power transmission systems are inherently non-radiating of electromagnetic waves.

In both the DC system 9 shown in FIG. 1 and the AC system 10 shown in FIG. 2, it is possible to construct the respective on-site generating units 10 and 100 on portable platforms (not shown) such as skids. Portable mounting of an on-site generating unit provides the capability to employ the unit temporarily and then to remove it when it is no longer necessary or desirable to produce electric power from the fossil fuel deposit at which the unit was employed. A portably mounted, on-site generating unit is used, for example, in a low-capacity gas field and then removed when the field is depleted. Alternatively, on-site generating units can be deployed seasonally to provide peak capacity or in response to value fluctuations in the energy market which may periodically render on-site generation of electrical power adjacent a fossil fuel deposit more profitable than extracting and transporting the fossil fuel from the deposit to a remote location for consumption.

From the foregoing disclosure and the accompanying drawings, it can be seen that the present invention provides certain novel and useful features that will be apparent to those skilled in the pertinent art. In particular there has been described a system for generating and transporting energy from a remotely located fossil fuel deposit to an energy utilization center and an improved electrical transmission system for delivering the energy derived from such fuel deposits.

The terms and expressions which have been employed are used as terms of description and not of limitation and there is no intention in the use of such terms and expressions of excluding any equivalents of the features shown and described, or portions thereof, but it is recognized that various modifications are possible within the scope of the invention claimed.

I claim:

1. A method of transporting energy from a remotely located deposit of fossil fuel to an energy utilization center comprising the steps of:

tapping a deposit of fossil fuel that is located at a first site remote from the energy utilization center;

locating a combustion turbine/AC generator set at the site of said remotely located deposit of fossil fuel;

supplying the fossil fuel to the combustion turbine/AC generator set;

generating AC electrical energy by operation of said combustion turbine/AC generator set;

converting the AC electrical energy to DC electrical energy;

combining the DC electrical energy produced at the remote site in parallel with DC electrical energy produced at a second site remote from the energy utilization center; and transmitting the combined DC electrical energy toward the energy utilization center.

2. The method of claim 1 wherein said combustion turbine/AC generator set operates at a speed of at least 3600 revolutions per minute.

3. The method of claim 1 wherein the fossil fuel is natural gas having an energy content of less than 1100 Btu/ft$^3$.

4. The method of claim 1 wherein said combining step is performed at a third site remote from said first and second sites and remote from said energy utilization center.

5. The method of claim 4 wherein said combining step comprises the step of coupling the DC electrical energy produced at the first site through a diode to a DC transmission line.

6. The method of claim 5 wherein said combining step comprises utilizing the forward conduction voltage of the diode to energize a cooling system for cooling the diode, 7. The method of claim 1 comprising producing DC electrical energy at the second site by the steps of:

operating a second combustion turbine/AC generator set at the second site to produce AC electrical energy at the second site; and converting the AC electrical energy produced by the second combustion turbine/AC generator set to DC electrical energy at the second site;

the method further comprising the step of allowing the first and second combustion turbine/AC generator sets to operate independently at speeds between about 4,000 and 20,000 RPM.

8. The method of claim 7 comprising the step of allowing said first and second combustion turbine/AC generator sets to operate independently at speeds between about 5,000 and 10,000 RPM.

9. The method of claim 7 wherein said combining step comprises the steps of:

conducting the DC electrical energy produced at the first site through a first diode connected with a DC transmission line; and conducting the DC electrical energy produced at the second site through a second diode connected with the DC transmission line.

10. The method of claim 9 wherein said first site, said second site, said first diode, and said second diode are mutually remote from one another.

11. The method of claim 10 comprising the step of independently cooling said first and second diodes with respective cooling systems energized by the respective forward conduction voltages of the first and second diodes.

12. A system for transporting energy from a remotely located site having a deposit of fossil fuel to an energy utilization center, said system comprising:

energy conversion means located on the site of said fossil fuel deposit and operatively connected to receive the fossil fuel therefrom for converting the fossil fuel to DC electrical energy; and local high-voltage transmission means for carrying the DC electrical energy from the site of said fossil fuel deposit;

main high-voltage transmission means for transmitting the DC electrical energy toward the energy utilization center; and coupling means for coupling the local transmission means in parallel with the main transmission means, said coupling means comprising a cooling system energized by a relatively low voltage difference between the local transmission means and the main transmission means.

13. The system of claim 12 wherein said fossil fuel is selected from the group consisting of natural gas, petroleum, and coal.

14. The system of claim 12 wherein said energy conversion means comprises:

a combustion turbine for converting the fossil fuel to mechanical energy; and an electric generator operatively coupled to said combustion turbine for converting the mechanical energy to AC electrical energy; and AC to DC conversion means for converting the AC electrical energy into the DC electrical energy produced by the energy conversion means.

15. The system of claim 14 wherein said energy conversion means further comprises:

heat conduction means for conducting waste heat away from said combustion turbine; and waste heat conversion means operatively connected to receive said waste heat from said heat conduction means for converting at least a portion of said waste heat to AC electrical energy.

16. The system of claim 15 wherein said waste heat conversion means comprises:

a solid-state thermoelectric generator for generating additional DC electrical energy from said waste heat; and DC to AC inversion means operatively connected to said thermo-electric generator and synchronized with said electric generator for converting the additional DC electrical energy to AC electrical energy that is compatible in voltage and frequency with the AC electrical energy generated by said electric generator.

17. A system for transporting energy from a remotely located site having a deposit of fossil fuel to an energy utilization center, said system comprising:

a combustion turbine located at the site for receiving the fossil fuel and for converting the fossil fuel to mechanical energy;

an electric generator operatively coupled to said combustion turbine for converting the mechanical energy to electrical energy;

heat conduction means for conducting waste heat away from said combustion turbine;

waste heat conversion means operatively connected to receive said waste heat from said heat conduction means for converting at least a portion of said waste heat to electrical energy;

combining means for combining the electrical energy from the generator and from the waste heat conversion means; and transmission means for carrying the combined electrical energy from the site of said fossil fuel deposit to the energy utilization center.

18. The system of claim 17 wherein said electric generator is directly coupled to said combustion turbine whereby said generator is driven at a rotational speed equal to the rotational speed of said turbine.

19. The system of claim 17 wherein said waste heat conversion means comprises a solid state thermoelectric generator for generating DC thermoelectric energy, said electric generator is configured to produce AC electrical energy, and said combining means comprises DC to AC inversion means for converting the DC thermoelectric energy into AC electrical energy for combination with the output of the electric generator.

20. The system of claim 17 wherein said remotely located fossil fuel deposit comprises a natural gas well.

21. The system of claim 20 wherein said natural gas well contains natural gas having an energy content of less than 1000 Btu/ft$^3$.

22. The system of claim 17 wherein said electric generator is operatively coupled to said combustion turbine for converting the mechanical energy to AC electrical energy at a variable frequency, the system further comprising AC to DC conversion means operatively connected to said electric generator for converting the AC electrical energy to DC electrical energy.

23. The system of claim 22 wherein said transmission means comprises local DC transmission means for transmitting the DC electrical energy from the combining means; main DC transmission means for transmitting the DC electrical energy toward the energy utilization center; and coupling means for coupling the local DC transmission means in parallel with the main DC transmission means.

24. The system of claim 23 wherein said coupling means includes current control means for allowing electrical current to flow substantially in one direction within said local DC transmission means from said combining means toward said utilization center.

25. The system of claim 24 wherein said current control means comprises:

a plurality of diodes connected in series with said local DC transmission means at a location remote from said combining means, said diodes having a forward conduction voltage; and cooling means energized by said forward conduction voltage for cooling said current control means.

26. The system of claim 23 wherein said transmission means further comprises DC to AC inversion means operatively connected to said main DC transmission means near the energy utilization center for converting the DC electrical energy to AC electrical energy at a voltage and frequency that are compatible with the energy utilization center.

27. The system of claim 13 wherein said waste heat conversion means is configured to produce DC electrical energy, and wherein said combining means for combining the electrical energy produced by the waste heat conversion means with the electrical energy produced by the generator comprises a DC to AC inverter for converting the DC electrical energy from the waste heat conversion means into AC electrical energy for combining with the AC electrical energy produced by the generator.

28. An energy system for transporting electrical energy to a load from deposits of fossil fuel, the system comprising:
   (a) a plurality of extraction means each disposed for extracting fossil fuel from one of the deposits of fossil fuel;
   (b) a plurality of electrical generating units each located in substantial proximity to one of said plurality of extraction means, each of said units being connected to receive said fossil fuel from one of said deposits and to produce DC electricity;
   (c) a DC bus;
   (d) a plurality of transmission lines each connected in parallel between one of said electrical generating units and said DC bus;
   (e) DC-to-AC conversion means operatively connected to said DC bus for converting the DC electricity into AC electricity; and
   (f) second transmission means for carrying the AC electricity to the load.

29. The energy system of claim 28 wherein at least one of said deposits of fossil fuel contains natural gas and at least one of said generating units comprises:
   (i) a gas-fueled combustion turbine located in substantial proximity to the natural gas deposit and connected to receive gas from the deposit for converting the natural gas into mechanical energy in the form of rotary motion, said combustion turbine having an exhaust stream for exhausting waste heat;
   (ii) an AC generator operatively connected to said combustion turbine for generating electrical energy;
   (iii) thermoelectric means formed for receiving the exhaust stream, for converting the waste heat of said combustion turbine into additional electrical energy, and for coupling said additional electrical energy with the electrical energy generated by said AC generator;
   (iv) a transformer for receiving said generated and said additional electrical energy at a first AC voltage and for stepping up said first AC voltage to a second AC voltage; and
   (v) AC-to-DC conversion means for converting said second AC voltage to a DC voltage.

30. The energy system of claim 29 wherein said AC-to-DC conversion means comprises a multiphase full-wave rectifier.

31. The energy system of claim 30 wherein said rectifier is a diode-based rectifier.

32. The energy system of claim 30 wherein said rectifier is a thyristor-based rectifier.

33. The energy system of claim 28 wherein the load is an AC power grid.

34. The energy system of claim 28 further comprising coupling means for coupling at least one of said plurality of transmission lines in parallel connection with the DC bus such that said transmission line is isolated from said DC bus in response to a reduced voltage on said transmission line relative to said DC bus.

35. The system of claim 34 wherein said coupling means comprises a plurality of diodes connected in series between said one transmission line and said DC bus.

36. The system of claim 35 wherein said coupling means comprises a cooling system for cooling said diodes and at least a portion of said diodes produces a forward conduction voltage sufficient for energizing said cooling system.

37. The system of claim 36 wherein said cooling system comprises a fan for circulating an electrically insulating gas within said coupling means.

38. The system of claim 35 comprising a threshold-voltage conduction device connected in parallel with said coupling means between said one transmission line and said DC bus.

39. The system of claim 28 wherein at least two of the electrical generating units each comprise an AC generator operatively coupled with a combustion turbine, and wherein each AC generator is operated at a speed that is independent of the other AC generator.

40. The system of claim 39 wherein said speed is at least 3,600 RPM.

41. The system of claim 40 wherein said speed is between about 4,000 and 20,000 RPM.

42. The system of claim 41 wherein said speed is between about 5,000 and 10,000 RPM.

43. An apparatus for coupling a source of DC current to a conductor, comprising:
   a plurality of first diodes connected in series between a first terminal and a second terminal for conducting said DC current between said first and second terminals,
   a plurality of second diodes connected in series between said second terminal and a third terminal for conducting said DC current between said second terminal and said third terminal and for producing a forward conduction voltage, and
   cooling means, energized by said forward conduction voltage, for circulating a coolant within the apparatus.

44. The apparatus of claim 43, comprising a plurality of third diodes connected in series between said second terminal and said third terminal, said third diodes being connected in reverse polarity between said second and third terminals relative to said second diodes for limiting the voltage between said second and third terminals to a predetermined voltage.

45. The apparatus of claim 44 wherein said cooling means comprises a fan, and wherein said coolant comprises an electrically insulating gas.

46. The apparatus of claim 45, comprising a capacitor connected between said second terminal and said third terminal for providing a transient conduction path between said second terminal and said third terminal.

47. The apparatus of claim 46, comprising a threshold-voltage conduction device connected between said first terminal and Said third terminal for providing a transient conduction path between said first terminal and said third terminal.

* * * * *